United States Patent
Yoshii et al.

(10) Patent No.: US 7,388,634 B2
(45) Date of Patent: Jun. 17, 2008

(54) REFLECTOR COMPRISING A PLURALITY OF CONCAVE PORTIONS AND LIQUID CRYSTAL DISPLAY DEVICE INCLUDING THE SAME

(75) Inventors: Katsumasa Yoshii, Fukushima-ken (JP); Mitsuru Kano, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 10/832,518

(22) Filed: Apr. 27, 2004

(65) Prior Publication Data

US 2004/0218119 A1    Nov. 4, 2004

(30) Foreign Application Priority Data

Apr. 30, 2003   (JP)   ............... 2003-125356

(51) Int. Cl.
G02F 1/1335   (2006.01)
(52) U.S. Cl. ........................ 349/113; 349/67
(58) Field of Classification Search .............. 349/65, 349/113, 67
See application file for complete search history.

(56) References Cited

U.S. PATENT DOCUMENTS

| | | | | |
|---|---|---|---|---|
| 4,706,173 A * | 11/1987 | Hamada et al. | ............. | 362/341 |
| 5,339,179 A * | 8/1994 | Rudisill et al. | ............... | 349/65 |
| 5,508,716 A * | 4/1996 | Prince et al. | ............... | 345/103 |
| 6,097,458 A * | 8/2000 | Tsuda et al. | ................ | 349/113 |
| 6,285,425 B1 * | 9/2001 | Akins et al. | ................ | 349/113 |
| 6,454,452 B1 * | 9/2002 | Sasagawa et al. | .......... | 362/561 |
| 6,609,809 B2 * | 8/2003 | Ohkawa | ...................... | 362/626 |
| 6,616,290 B2 * | 9/2003 | Ohkawa | ...................... | 362/619 |
| 6,676,129 B2 * | 1/2004 | Wilson | ...................... | 296/97.9 |
| 6,704,079 B2 * | 3/2004 | Minoura et al. | ............. | 349/113 |
| 6,746,129 B2 * | 6/2004 | Ohkawa | ...................... | 362/625 |
| 6,856,366 B2 * | 2/2005 | Matsushita et al. | .......... | 349/113 |
| 6,943,856 B2 * | 9/2005 | Yamaguchi et al. | .......... | 349/67 |
| 2002/0030774 A1 * | 3/2002 | Yoshii et al. | ................ | 349/113 |
| 2002/0054488 A1 * | 5/2002 | Ohkawa | ...................... | 362/31 |
| 2002/0149721 A1 * | 10/2002 | Minoura et al. | ............. | 349/113 |

FOREIGN PATENT DOCUMENTS

JP        2003-15129        1/2003

* cited by examiner

Primary Examiner—Michael H. Caley
Assistant Examiner—W. Patty Chen
(74) Attorney, Agent, or Firm—Brinks Hofer Gilson & Lione

(57) ABSTRACT

A reflector and a liquid crystal display device in which original reflection characteristics can be sufficiently accomplished and moiré patterns can be prevented are provided. A reflector 30 formed with a plurality of concave portions $28b_1$, $28b_2$ on one surface of a base member along one arrangement direction is employed. When defining the section passing through the deepest point of the concave portion as a first section and defining the section perpendicular to the first section at the deepest point as a second section, the concave portions $28b_1$, $28b_2$ have symmetrical shapes on the basis of the first section and have asymmetrical shapes on the basis of the second section. When defining the directions along the first section in the concave portions $28b_1$, $28b_2$ as axis directions $L_1$, $L_2$, each of the axis directions $L_1$, $L_2$ are not parallel with the arrangement direction, and the axis directions $L_1$, $L_2$ are set to two or more directions.

14 Claims, 10 Drawing Sheets

REFLECTOR COMPRISING A PLURALITY OF CONCAVE PORTIONS AND LIQUID CRYSTAL DISPLAY DEVICE INCLUDING THE SAME

This application claims the benefit of priority to Japanese Patent Application No. 2003-125356, herein incorporated by reference.

BACKGROUND OF THE INVENTION

1. Field of the Invention

The present invention relates to a reflector and a liquid crystal display device having asymmetrical concave portions, and more particularly to a reflector capable of preventing the moiré patterns from being generated by orienting the axis of the concave portion in a particular direction.

2. Description of the Related Art

A reflective liquid crystal display device is a liquid crystal display device using illumination light such as solar light or a front light as a light source and is mainly used in a portable information terminal requiring low power. Also, as another example, there is a semi-reflective liquid crystal display device. This is a liquid crystal display device which operates in a transmission mode by lighting an internal back light unit when external light can not be sufficiently obtained and operates in a reflection mode by extinguishing the back light unit when external light can be sufficiently obtained, and is mainly used in portable electronics such as a portable telephone or a notebook computer.

In the above-mentioned reflective liquid crystal device, there should be a reflector which reflects external light or front light, or transmits back light while reflecting external light. A conventional reflector is, for example, disclosed in the next Patent Document 1.

Japanese Unexamined Patent Application Publication No. 2003-15129

FIG. 16 shows the perspective view of the reflector disclosed in Patent Document 1. As shown in FIG. 16, the conventional reflector 130 is provided with concave portions 128b . . . adjacent to each other and having a plurality of reflectivities in the surface S of the plate-shaped base member 128 thereof. In addition, the base member 128 is formed with a reflective film 128a such as an Al film. As shown in FIG. 17A, the concave portion 128b is divided by a contour comprising a first curve 128c on one peripheral portion S1 side and a second curve 128d on the other peripheral portion S2 side along a boundary line E.

Further, as shown in FIG. 17B, which is sectional view taken along line G-G, the first curve 128c is connected from the peripheral portion S1 to the boundary line E through a deepest point D S1 and the second curve 128d is connected from the boundary line E to the other peripheral portion S2 and is continuous with the first curve 128c.

Also, as shown in FIG. 17A, the contour of the concave portion is symmetrical across the axis of line G-G in drawings. In other words, the section along line G-G is the plane of symmetry of the concave portion.

Next, as shown in FIGS. 17 and 18, when the direction parallel with line G-G in FIG. 17A is defined as an axis direction $L_3$ of the concave portion, the axis directions $L_3$ of the concave portions 128b are set to be equal to each other. As shown in FIG. 18, when mounting the reflector on a liquid crystal display panel, the arrangement direction x of the pixel P formed in the liquid crystal display panel is equal to the axis direction $L_3$ of the concave portion 128b.

In a conventional liquid crystal display device, since a plurality of concave portions 128b each having a concave curved surface is mounted on the reflector 130, the bright display range can be widely ensured and the reflection can be controlled.

However, in the conventional liquid crystal display device, since the arrangement direction x of the pixel P formed in the liquid crystal display panel is equal to the axis direction $L_3$ of the concave portion 128b, there is a problem in that an interference pattern of the light is apt to be generated between the reflector and the liquid crystal display panel, or moiré lines or rainbow color is apt to be generated.

In order to prevent the moiré effect, it is required that the reflector is obliquely mounted with respect to the liquid crystal display panel so that the angle between the arrangement direction x of the pixel P and the axis direction $L_3$ of the concave portion 128b becomes a predetermined moiré angle. When employing this structure, because the direction of the reflective surface is deviated, there was a problem that it is difficult to achieve the desired reflection characteristics of the reflector.

SUMMARY OF THE INVENTION

The present invention has been made in order to solve the above-mentioned problems, and provide a reflector and a liquid crystal display device in which the moiré effect is prevented while achieving the desired reflection characteristics.

In order to solve the above-mentioned problems, the present invention employs the following structure.

A reflector according to the present invention is characterized in that the reflector is formed with a plurality of concave portions on one surface of a base member, when defining the section passing through the deepest point of the concave portion as a first section and defining the section perpendicular to the first section at the deepest point as a second section, the concave portions have symmetrical shapes on the basis of the first section and have asymmetrical shapes on the basis of the second section, and, when defining the directions along the first section in each of the concave portions as axis directions, the axis directions are set to two or more directions.

Since the axis directions of the concave portions are set to two or more directions in every concave portion, the moiré effect can be prevented.

A reflector according to the present invention is characterized in that the reflector is formed with a plurality of concave portions on one surface of a base member along one arrangement direction, when defining the section passing through the deepest point of the concave portion as a first section and defining the section perpendicular to the first section at the deepest point as a second section, the concave portions have symmetrical shapes on the basis of the first section and have asymmetrical shapes on the basis of the second section, and, when defining the directions along the first section in each of the concave portions as axis directions, the axis directions are not parallel with the arrangement direction of the concave portions and the axis directions are set to two or more directions.

According to such a reflector, since the axis direction of the concave portion is not parallel with the arrangement direction, the moiré effect can be prevented. Also, since the axis directions of the concave portions are set to two or more direction, the change of the reflectivity due to variation of the viewing direction of the viewer can be reduced.

The reflector according to the present invention is the above-mentioned reflector and is characterized in that, when defining the angle between the average direction of the axis directions of all the concave portions and the arrangement direction of the pixel as an average axis angle $\theta_m$, the absolute value of the average axis angle $\theta_m$ is set in the range of $0° \leq \theta_m \leq 20°$.

According to the present invention, since the average angle $\theta_m$ is set in the above-mentioned range, the change of the reflectivity due to variation of the viewing direction of the viewer can be further reduced. Also, the reflectivity of the reflection light can be increased over a wide range of reflection angles.

Further, the reflector according to the present invention is the above-mentioned reflector, and is characterized in that, when defining the angle between the axis direction of the concave portions and the arrangement direction of the pixels as an axis angle, the concave portions comprise a plurality of first concave portions having the axis angle of $\theta_1°$ and a plurality of second concave portions having the axis angle of $\theta_2°$ and the average axis angle $\theta_m$ is set to $0°$.

Also, in the above-mentioned reflector, it is desirable that the relationship between the axis angle $\theta_1°$ and the axis angle $\theta_2°$ is $\theta_2° = -\theta_1°$, and the axis angle $\theta_1°$ is set in the range of $0° < \theta_1 \leq 20°$.

According to this reflector, the range of reflection angles of the reflection light can become significantly wider than the conventional reflector, and the change of the reflectivity due to variation of the viewing direction of the viewer can be further reduced.

In addition, the reflector according to the present invention is the above-mentioned reflector, and is characterized in that, when defining the angle between the axis direction of the concave portions and the arrangement direction of the pixels as an axis angle, the concave portions comprise a plurality of first concave portions having the axis angle of $\theta_1°$ and a plurality of second concave portions having the axis angle of $\theta_2°$, and, when defining the angle between the average direction of the axis directions of all the concave portions and the arrangement direction of the pixels as an average axis angle $\theta_m$, the absolute value of the average axis angle $\theta_m$ is set in the range of $0° < \theta_m \leq 20°$.

Also, in the above-mentioned reflector, it is desirable that the axis angle $\theta_1°$ is set in the range of $-20° < \theta_1 \leq 40°$, and the axis angle $\theta_2°$ is set in the range of $-40° \leq \theta_2° < 20°$.

According to this reflector, the range of reflection angles of the reflection light can become significantly wider than the conventional reflector, and the change of the reflectivity due to variation of the viewing direction of the viewer can be further reduced.

Next, a liquid crystal display device according to the present invention comprises a pair of substrates, a liquid crystal layer positioned between the substrates, driving electrodes formed the liquid crystal layer side of the substrates, and any one of the above-mentioned reflectors mounted on any one of the substrates, wherein the arrangement direction of the pixels comprised of the driving electrodes and the liquid crystal layer is equal to one arrangement direction in the reflector.

As mentioned above, in the above-mentioned reflector, when defining the directions along the first section in each of the concave portions as axis directions, the axis directions are not parallel with the arrangement direction of the concave portion and the axis directions are set to two or more directions.

In other words, according to the liquid crystal display device and the reflector, since the arrangement direction of the pixels is equal to the arrangement direction of the concave portions in the reflector and the axis direction of the concave portions are not parallel with the arrangement direction of the concave portions, the arrangement direction of the pixels is not parallel with the axis direction of the concave portions. Thereby, the interference of the light between the pixels and the concave portions of the reflector can be reduced and thus the generation of moiré patterns can be remarkably reduced.

Also, since the axis directions of the concave portions are set to two or more directions, the change of the reflectivity due to variation of the viewing direction of the viewer can be further reduced.

Further, since the average axis angle $\theta_m$ is in the above-mentioned range, the change of the reflectivity due to variation of the viewing direction of the viewer can be further reduced. Also, the reflectivity of the reflection light can be increased over a wide range of reflection angles.

Also, the range of reflection angles of the reflection light can become significantly wider than the conventional reflector, and the change of the reflectivity due to variation of the viewing direction of the viewer can be further reduced.

BRIEF DESCRIPTION OF THE DRAWINGS

FIG. 3 shows a concave portion formed on the reflector shown in FIG. 2, wherein

FIG. 17 shows a concave portion formed on the conventional reflector, wherein

DESCRIPTION OF THE PREFERRED EMBODIMENT

The embodiment of the present invention will be further illustrated with reference to the accompanying drawings.

First Embodiment

Figure 1:
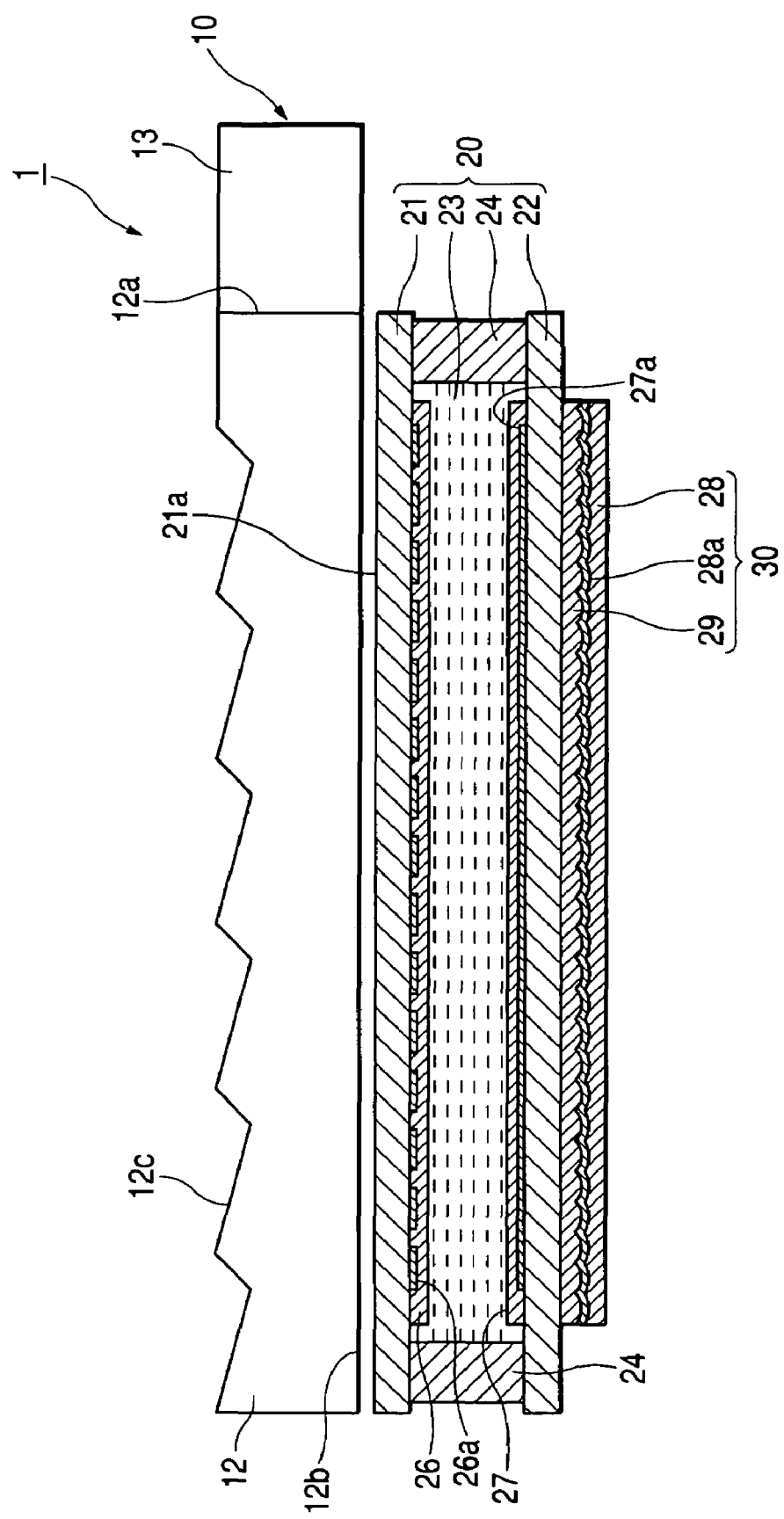
FIG. 1 is a schematic sectional view showing a liquid crystal display device according to a first embodiment of the present invention.
Figure 2:
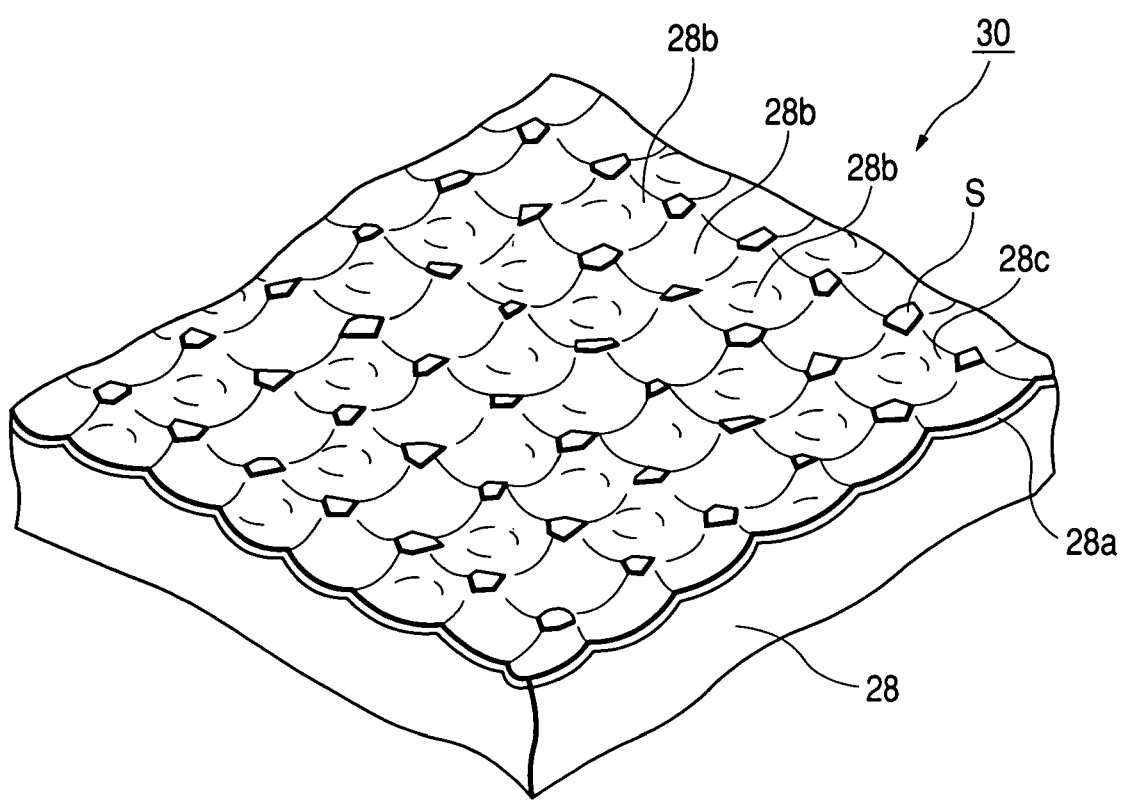
FIG. 2 is a perspective view showing a reflector included in the liquid crystal display device according to the first embodiment of the present invention.

FIG. 1 is a schematic sectional view showing a liquid crystal display device according to a first embodiment of the present invention, and FIG. 2 is a perspective view of a reflector included in the liquid crystal display device.

As shown in FIG. 1, the liquid crystal display device 1 according to the present invention is a reflective liquid crystal display device generally comprising a liquid crystal display panel 20 and a front light unit 10 arranged on the viewing side of the liquid crystal display panel 20 (on the side which is to be viewed).

As shown in FIG. 1, the liquid crystal display panel 20 comprises a first substrate 21 and a second substrate 22 (a pair of substrates) adhered to each other by sealing material 24 and with a liquid crystal layer 23 sandwiched therebetween. Also, the outer surface of the first substrate 21 is a display surface 21a. The first substrate 21 and the second substrate 22 are composed of a transparent substrate such as a glass substrate and the two surfaces of the substrates on the liquid crystal layer 23 side are mounted with display circuits 26 and 27, respectively. The display circuits 26, 27 include electrode layers 26a, 27a (driving electrodes) composed of a transparent conductive film (not shown) for driving the liquid crystal layer 23 and an alignment film for controlling the alignment of the liquid crystal layer. In the case of performing color display, color filters may be included in any one of the display circuits 26, 27.

The liquid crystal display panel 20 according to the present embodiment is a so-called passive matrix liquid crystal display panel, in which the electrode layers 26a, 27a composed of a plurality of ITO films are intersected with each other and pixels are formed at the intersections.

Next, as shown in FIG. 1, the front light unit 10 is arranged on display surface 21a side (the side to be viewed by the user) of the first substrate 21 of the liquid crystal display panel 20. The front light unit 10 has a light source 13 composed of a cathode ray tube at the side end 12a of the transparent light guide plate 12 composed of, for example, acrylic resin, and the lower surface of the light guide plate 12 (the surface on the liquid crystal display panel 20 side) is a smooth emitting surface 12b for emitting the light. In addition, the surface opposite to the emitting surface 12b of the light guide plate 12 (the upper surface of the light guide plate 12) is a prism surface 12c for changing the direction of the propagated light which has a plurality of wedge-shaped grooves spaced apart at a predetermined pitch.

Also, as shown in FIG. 1, the outer surface of the second substrate 22, that is, the surface opposite to the surface facing the liquid crystal layer is mounted with a reflector 30. As shown in FIG. 1, the reflector 30 comprises a base member 28 composed of polycarbonate, a reflective film 28a laminated onto the base member 28, and an adhesive layer 29.

When explaining the reflector 30 in detail, as shown in FIG. 2, this reflector 30 comprises the base member 28 and the reflective film 28a laminated onto the base member 28. A plurality of concave portions 28b . . . are provided on a surface S of the base member 28, and a reflective film 28a is formed on the concave portions 28b . . . The reflective film 28a has an irregular surface due to the surface shape of the base member 28 including the concave portions 28n . . . and the irregular surface is the reflective surface 28c. The surface S of the base member 28 is divided into a plurality of surfaces by forming the concave portions 28b. Further, the shapes of the concave portions 28b are asymmetrical spherical surfaces, as described below.

In addition, the base member 28 is composed of a resin such as polycarbonate or resist and the thickness thereof is about 2 to 100 μm. If the thickness of the base member 28 is less than 2 μm, it is difficult to form the concave portion 28b, and, if the thickness thereof is more than 100 μm, the total thickness of the reflector 30 becomes large, and a liquid crystal display panel 20 having a slim profile cannot be made.

Next, the reflective film 28a is composed of metal having high reflectivity such as Al or Ag, and is formed by a deposition method. The thickness of the reflective film 28a is desirably in the range of 80 nm to 200 nm. If the thickness thereof is less than 80 nm, then the reflectivity of the light by the reflective film 28a is decreased and thus the display fades out. If the thickness thereof is more than 200 nm, the manufacturing cost of the film is excessively increased and the film will not accurately follow the undulation of the concave portions 28b.

Figure 3A:
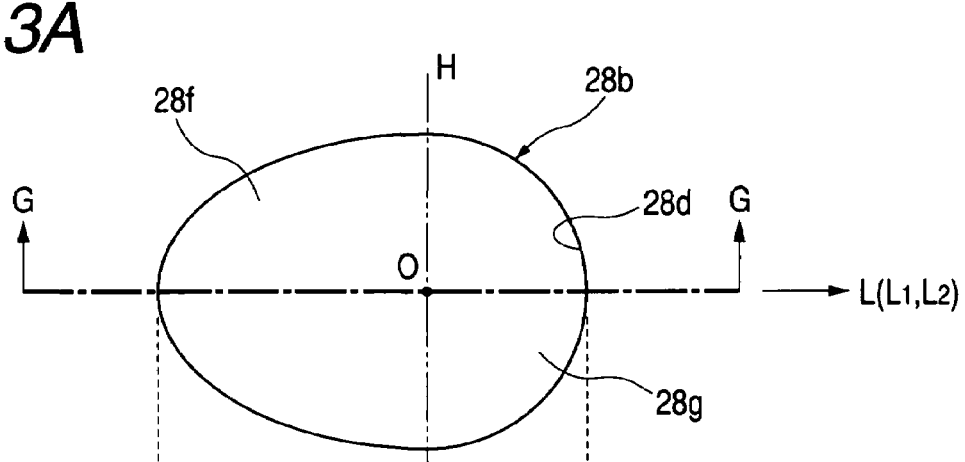
FIG. 3*a* is a plan view thereof and FIG. 3*b* is a sectional view thereof taken along line G-G.
Figure 3B:
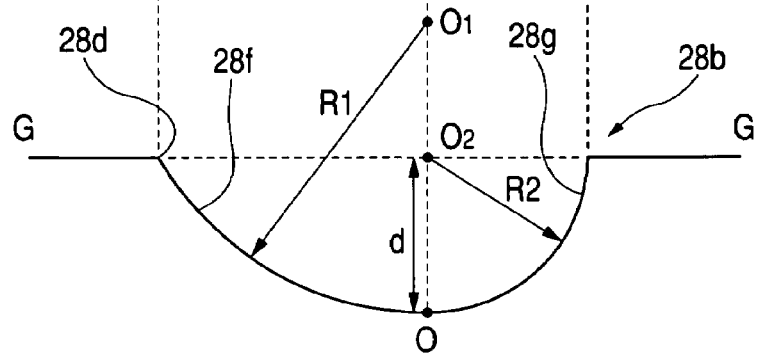

Next, FIG. 3 shows the inner shape of the concave portion formed on the reflector 30. As shown in FIGS. 3A and 3B, the inner surface of the concave portion 28b comprises a first curved surface 28f and second curved surface 28g that are portions of two spherical surfaces each having a different radius. The centers $O_1$, $O_2$ of these curved surfaces 28f, 28g are arranged on the normal line through the deepest point O of the concave portion 28b, the first curved surface 28f is a portion of a spherical surface having a radius R1 centered on $O_1$, and the second curved surface 28g is a portion of a spherical surface having a radius R2 centered on $O_2$. In plan view of FIG. 3a, in the vicinity of the straight line H perpendicular to line G-G and passing through the deepest point O of the concave portion 28b, the inner surface is divided into the first curved surface 28f and the second curved surface 28g. The depth d of the concave portion 28b is about 0.3b to 2.0 μm.

In addition, as shown in FIG. 3a, when defining the section corresponding to line G-G passing through the deepest point O of the concave portion 28b as a first section, the shape of the concave portion 28b in plan view is symmetrical on the basis of the first section (line G-G). Also, when defining the section corresponding to the straight line H perpendicular to the first section at the deepest point O of the concave portion 28b as a second section, the shape of the concave portion 28b in plan view is asymmetrical on the basis of the second section (straight line H). In this way, the first section (line G-G) is the plane of symmetry of the inner shape of the concave portion 28b. In the present embodiment, the direction oriented from the first curved surface 28f to the second curved surface 28g along this plane of symmetry (line G-G) is defined as an axis direction L of the concave portion.

Figure 4:
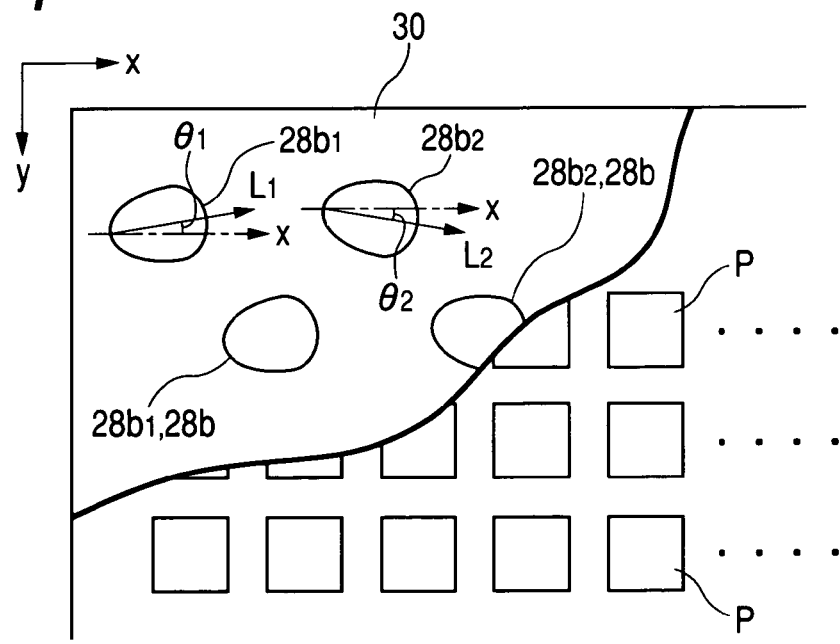
FIG. 4 is a schematic plan view showing essential parts of the liquid crystal display device according to the first embodiment of the present invention.

Next, the arrangement state of the concave portion 28b in the reflector 30 is schematically shown in FIG. 4. At the same time, the location relationship between the concave portion 28b and the pixel P is schematically shown in FIG. 4. Also, the size of the concave portion 28b and the pixel P shown in FIG. 4 were changed, for convenience of explanation thereof.

As shown in FIG. 4, the concave portion 28b is arranged such that the axis direction L thereof is not parallel with the arrangement direction (the x direction) In other words, when defining the angle between the axis direction L of the concave portion 28b and the arrangement direction (the x direction) of the pixel as the axis angle, the concave portion 28b is arranged on the base member 28 so that the axis angle becomes $\theta_1°$ or $\theta_2°$. In this way, the concave portion 28b has a concave portion $28b_1$ having the axis angle $\theta_1°$ and a concave portion $28b_2$ having the axis angle $\theta_2°$. The axis directions of the concave portions 28b are set to two directions $L_1$, $L_2$.

In addition, the axis angle $\theta_2°$ and the axis angle $\theta_1°$ are set so that the relationship thereof becomes $\theta_2°=-\theta_1°$ on the basis of the arrangement direction x. Thereby, the axis directions $L_1$, $L_2$ of the concave portions $28b_1$, $28b_2$ have the same angle but are oriented in opposite directions, defining the arrangement direction (the x direction) of the pixel as a symmetrical axis. Also, the axis angle $\theta_1$ is set in the range of $0°<\theta\leq20°$. In the case that the axis angle $\theta_1$ is less than 0°, the moiré effect cannot be prevented in the liquid crystal display device. In the case that the axis angle $\theta_1$ is more than 20°, since the deviation between the axis directions $L_1$, $L_2$ of the concave portion 28b and the viewing direction of the viewer become increased, the required reflection characteristics cannot be obtained.

The pixel P shown in FIG. 4 comprises the electrode layers 26a, 27a (the driving electrodes) and the liquid crystal layer 23. That is, the pixel P is formed by intersecting and overlapping the electrode layers 26a, 27a while sandwiching the liquid crystal layer 23 between the electrode layers 26a, 27a. The pixel P is arranged in a matrix along the x direction and the y direction perpendicular to the x direction in the drawings. In the present embodiment, the x direction is defined as the arrangement direction of the pixel P.

As shown in FIG. 4, the reflector 30 is positioned such that the arrangement direction (the horizontal direction in the drawings) of the concave portion 28b is substantially equal to the arrangement direction of the pixel P (the x direction in the drawings) in the liquid crystal display panel 20. Thereby, the arrangement direction (the x direction) of the pixel P is not parallel with the axis directions $L_1$, $L_2$ of the concave portion 28b.

Figure 5:
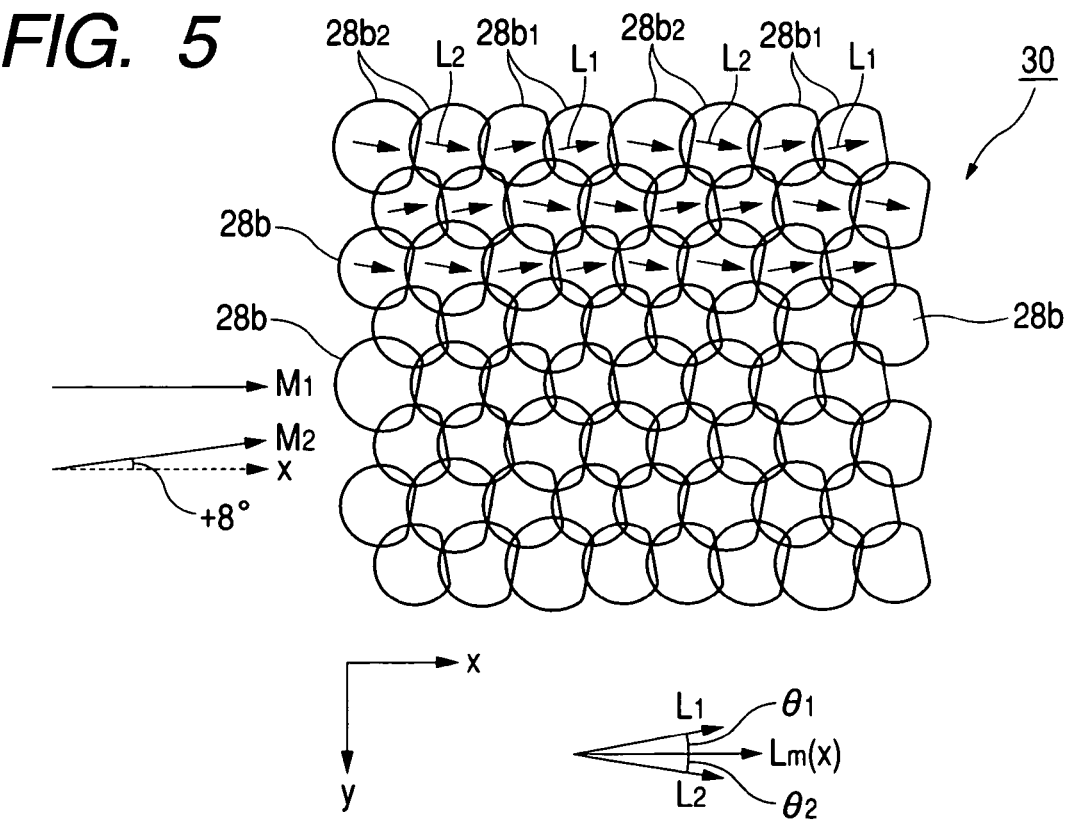
FIG. 5 is a schematic plan view showing a portion of the reflector shown in FIG. 2.

FIG. 5 shows the concrete arrangement state of the concave portions 28b in the reflector 30. As shown in FIG. 5, along the arrangement direction x of the pixel P, concave portions $28b_1$ having the axis direction $L_1$ are alternated with concave portions $28b_2$ having the axis direction $L_2$ every two.

The number of concave portions $28b_1$ and $28b_2$ are substantially equal to each other. Also, since the axis angle $\theta_2°$ of the concave portions $28b_2$ with respect to the axis angle $\theta_1°$ of the concave portions $28b_1$ are related by $\theta_2°=-\theta_1°$ on the basis of the arrangement direction x of the pixel P, the average direction $L_m$ becomes equal to the arrangement direction (the x direction) of the pixel, when defining the direction obtained by averaging the axis directions $L_1$, $L_2$ of all the concave portions $28b_1$, $28b_2$, as the average direction $L_m$. In other words, the average axis angle $\theta_m$ between the average direction $L_m$ and the arrangement direction (the x direction) of the pixel is set to 0°.

In addition, the average direction $L_m$ means the direction obtained by averaging the axis directions $L_1$, $L_2$ of all the concave portions $28b_1$, $28b_2$.

Figure 6:
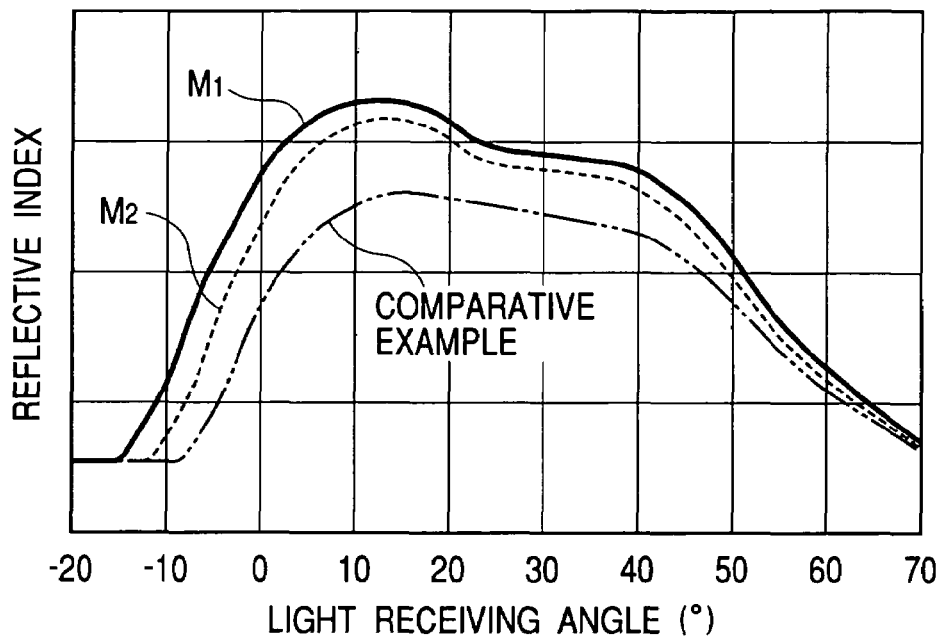
FIG. 6 shows the reflection characteristics of the reflector shown in FIG. 2 and is a graph showing the relationship between the light-receiving angle and reflectivity.

FIG. 6 graphically illustrates the results from measuring the reflectivity (%) of the reflector 30 when radiating light to the reflector 30 comprising the above-mentioned structure at an incidence angle of 30° in the right side in FIG. 3 and changing the light-receiving angle over the range of ±30° (0 to 60°; 0° corresponds to the normal direction of the surface of the reflector) on the basis of 30° that is the specular direction for the reflective surface. Also, the solid line in FIG. 6 is the measured result of the reflectivity of the reflector when viewing it in the direction equal to the arrangement direction of the concave portion (the $M_1$ direction in FIG. 5), and the dotted line in FIG. 6 is the measured result of the reflectivity of the reflector when viewing it in the direction offset by ±8° from the arrangement direction of the concave portion (the $M_2$ direction in FIG. 5).

Also, the comparative example in FIG. 6 is a reflector similar to the reflector 30, except that the axis directions of all the concave portions are same. The measured result of the reflectivity of the reflector according to this comparative example is also shown in FIG. 6.

As shown in FIG. 6, it can be understood that high reflectivity can be obtained over a wide range of light-receiving angles, about 15° to 50° even when it is viewed from any one of the $M_1$ direction or the $M_2$ direction. Also, the reflectivity at low angles when viewing it from the $M_1$ direction is slightly higher than that when viewing it from the $M_2$ direction and thus some difference is generated in the light-receiving angle range.

The reason that the high reflectivity is obtained over a wide range of light-receiving angles is because the absolute value of the inclined angle of the second curved surface 28g having a relatively small radius is relatively large and the reflected light is diffused in a wide angle. Also, since reflection diffused in the smaller range of a predetermined direction in the second curved surface 28g is generated by the reflection on the first curved surface 28f having a relatively large radius, the reflectivity becomes larger at the angle smaller than 30° that is the specular direction. As a result, since the peak of the light incident to and reflected from the reflector 30 is shifted to the side closer to the normal direction of the reflector 30 than the specular direction, the reflective brightness in the forward direction of the reflector 30 can be increased. Accordingly, for example, if the reflector 30 according to the present embodiment is applied to the reflective layer of the liquid crystal display device 1, the reflective brightness in the forward direction of the liquid crystal display device 1 can be improved. Thereby, the brightness in the direction of the viewer of the liquid crystal display device 1 can be increased.

Further, the reflectivity of the reflector according to the comparative example is lower than that of the reflector 30 according to the present embodiment at all of the angles.

In addition, in the liquid crystal display device according to the present embodiment, the moiré effect was not exhibited when viewing it from any one of the $M_1$ direction or the $M_2$ direction. This is because the axis directions $L_1$, $L_2$ of the concave portions are not parallel with the arrangement direction (the x direction) of the pixels P, and thus the interference of the light between the reflector 30 and the liquid crystal display panel 20 is minimized.

On the other hand, in the reflector according to the comparative example, the moiré effect was exhibited. This is because the axis directions of all the concave portions are arranged to be equal to each other.

In addition, since the axis direction L of the concave portions is set to two directions $L_1$, $L_2$, the change of the reflectivity on the low angle side for a variation $M_1$-$M_2$ of the viewing direction of the viewer can be reduced.

Also, since the average axis angle $\theta_2 m$ between the average direction $L_m$ of the concave portions 28b and the arrangement direction (the x direction) of the pixels P is set to 0°, good reflection characteristics can be maintained without degrading the reflectivity. Also, the change of the reflectivity on the low angle side for a variation $M_1$-$M_2$ of the viewing direction of the viewer can be further reduced.

Further, because the axis angles $\theta_1$, $\theta_2(=-\theta_1)$ are set in the range of −20° to 20°, the deviation between the viewing directions $M_1$, $M_2$ of the viewer and the axis directions $L_1$, $L_2$ of the concave portions 28b is allowed, and sufficiently good reflection characteristics can be obtained.

Second Embodiment

Figure 7:
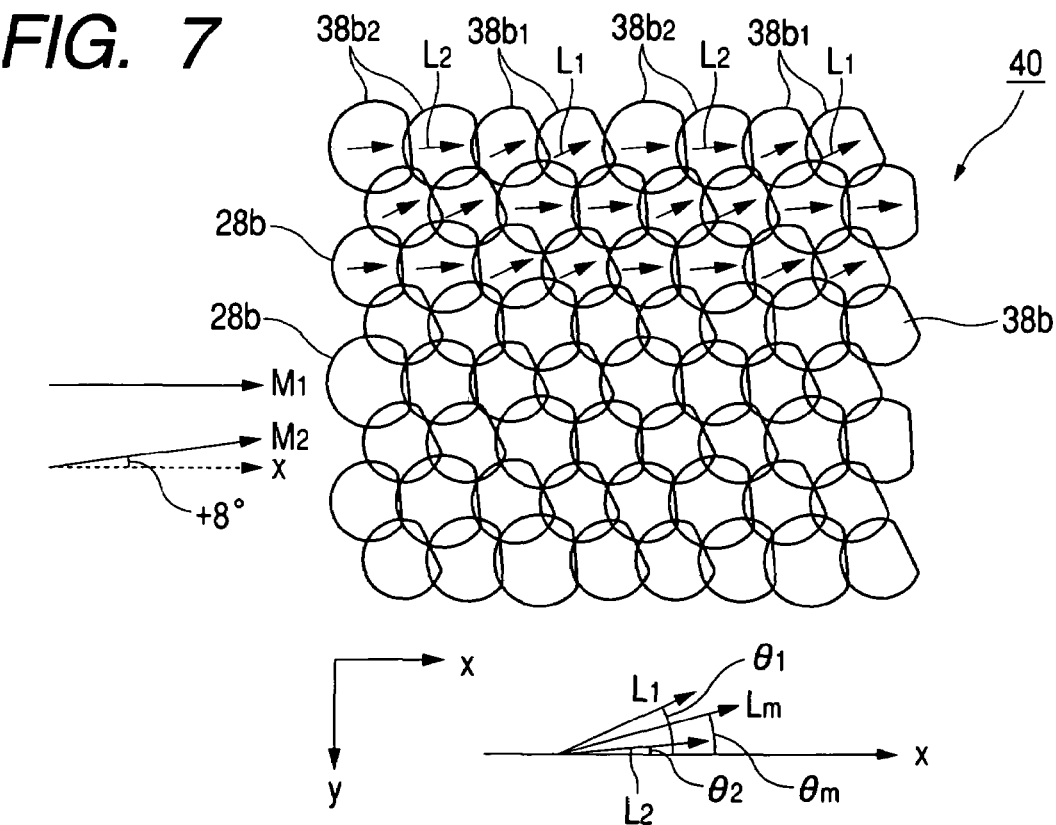
FIG. 7 is a schematic plan view showing a portion of a reflector according to a second embodiment of the present invention.

Next, a second embodiment of the present invention will be explained with reference to the drawings. FIG. 7 shows the concrete arrangement state of the concave portions 38b in the reflector 40 according to this embodiment. Also, the reflector 40 according to this embodiment is similar to the reflector 30 according to the first embodiment, except that the axis angles $\theta_1$, $\theta_2$ of the concave portions 38b and the average axis angle $\theta_m$ are different from the axis angles $\theta_1$, $\theta_2$ and the average axis angle $\theta_m$ according to the first embodiment. That is, in the first and second embodiments, the inner shape of the concave portion 38b, the material of the base member, and the material and thickness of the reflective film are equivalent.

Accordingly, in the below description, only the axis angles $\theta_1$, $\theta_2$ of the concave portions 38b and the average axis angle $\theta_m$ will be explained, and the other details will be omitted.

As shown in FIG. 7, the reflector 40 according to the present embodiment is formed with concave portions $38b_1$ having the axis angle of $\theta_1°$ and a concave portion $28b_2$ having the axis angle of $\theta_2°$. The concave portions $38b_1$, $38b_2$ are alternated every two along the arrangement direction x of the pixels. Also, the number of concave portions $38b_1$ and concave portions $38b_2$ on the reflector 40 is substantially equal to each other. In this way, the axis direction of each concave portion 38b is set to two directions $L_1$, $L_2$.

In addition, the axis directions $L_1$, $L_2$ of concave portions 38b are not parallel with the arrangement direction (the x direction) of the pixels P, similar to the first embodiment. Further, the axis directions $L_1$, $L_2$ of the concave portions 38b are oriented toward one side of the arrangement direction (the x direction) of the pixels P. That is, as shown in FIG. 7, the axis directions $L_1$, $L_2$ of concave portions 38b are oriented toward the direction opposite to the y direction in the drawings, along the arrangement direction (the x direction) of the pixels P.

Also, the axis angle $\theta_2°$ is set with respect to the axis angle $\theta_1°$ so that the relationship thereof becomes $\theta_1°>\theta_2°$. The axis angle $\theta_1°$ is set in the range of −20°<$\theta_1$<40° and the axis angle $\theta_2$ is set in the range of −40°≦$\theta_2$<20°.

Since the number of concave portions $38b_1$, $38b_2$ are equal to each other and the relationship between the axis angle $\theta_1°$ and $\theta_2°$ becomes $\theta_1°>\theta_2°$, the average direction $L_m$ is not parallel with the arrangement direction (the x direction) of the pixels P, when defining the direction obtained by averaging the axis directions $L_1$, $L_2$ of all the concave portions $38b_1$, $38b_2$ as the average direction $L_m$. That is, as shown in FIG. 7, the absolute value of the average axis angle $\theta_m$ between the average direction $L_m$ and the arrangement direction (the x direction) of the pixels P is set in the range of 0°<$\theta_m$≦20°.

Figure 8:
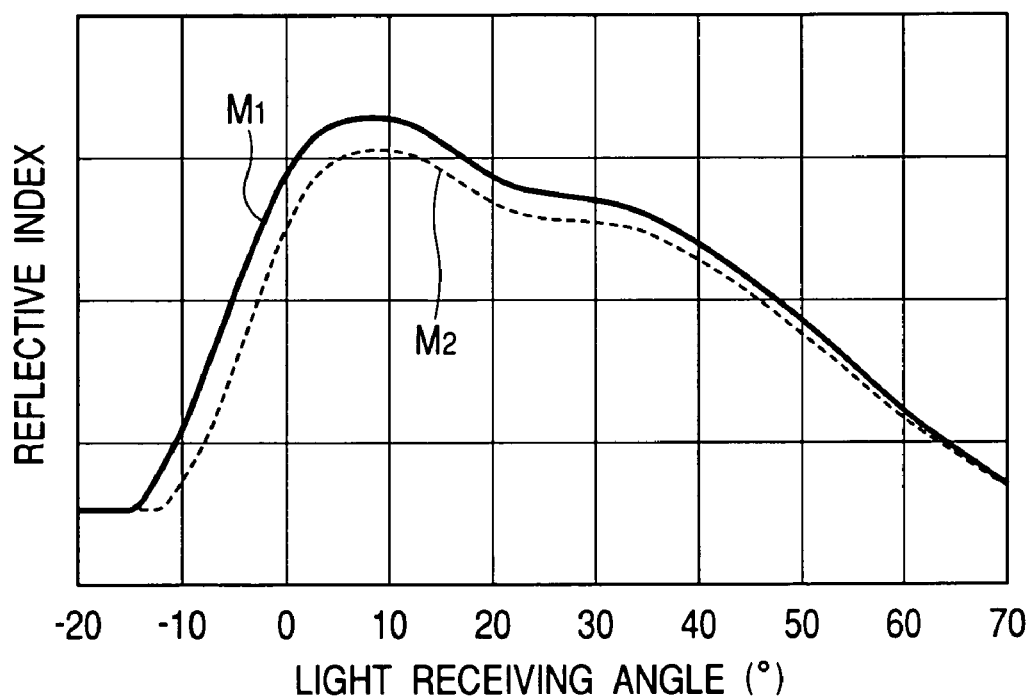
FIG. 8 shows the reflection characteristics of the reflector according to the second embodiment of the present invention and is a graph showing the relationship between the light-receiving angle and reflectivity.

FIG. 8 graphically illustrates the results from measuring the reflectivity (%) of the reflector 40 when radiating light to the reflector 40 comprising the above-mentioned structure at an incidence angle of 30° in the right side in FIG. 3 and changing the light-receiving angle over the range of +30° (0 to 60°; 0° corresponds to the normal direction of the surface of the reflector) on the basis of 30° that is the specular direction for the reflective surface. Also, the solid line in FIG. 8 is the measured result of the reflectivity of the reflector when viewing it in the direction equal to the arrangement direction (the x direction) of the pixels X (the $M_1$ direction in FIG. 5), and the dotted line in FIG. 8 is the measured result of the reflectivity of the reflector when viewing it in the direction offset by ±8° from the arrangement direction (the x direction) of the pixel P (the $M_2$ direction in FIG. 5).

As shown in FIG. 8, in the reflector 40 of the present embodiment, high reflectivity can be obtained over a wide range of light-receiving angles, about 15° to 50° even when it is viewed from any one of the $M_1$ direction or the $M_2$ direction. Particularly, in the reflector 40 according to the present embodiment, although it is viewed in either the $M_1$ direction or the $M_2$ direction, substantially the same reflectivity can be obtained over the same light-receiving angle range.

The reason that high reflectivity is obtained over the wide range of light-receiving angles and the reason that the reflectivity is large at angles less than the specular direction of 30° are equal to the reasons in the case of the reflector 28 of the first embodiment.

The reason that substantially the same reflectivity can be obtained over substantially the same light-receiving angle range although it is viewed from any one of the $M_1$ direction or the $M_2$ direction is because the reflector 40 has the concave portion $38b_1$ having the axis angle $\theta_1°$ and the concave portion $38b2$ having the axis angle $\theta_2°$ less than $\theta_1°$ so that the absolute value of the average axis angle $\theta_m$ is set in the range of 0<$\theta_m$≦20°.

Also, in the present embodiment, the moiré effect was not exhibited although it is viewed from any one of the $M_1$ direction or the $M_2$ direction. This is because the axis directions $L_1$, $L_2$ of the concave portions are not parallel with the arrangement direction (the x direction) of the pixels P and thus the interference of the light between the reflector and the liquid crystal display panel 20 is reduced.

Next, in a third embodiment and a fourth embodiment, an example of an asymmetrical concave portion appropriate for use in a reflector according to the present invention will be explained. Also, it is not limited to an asymmetrical shape.

Third Embodiment

Figure 9:
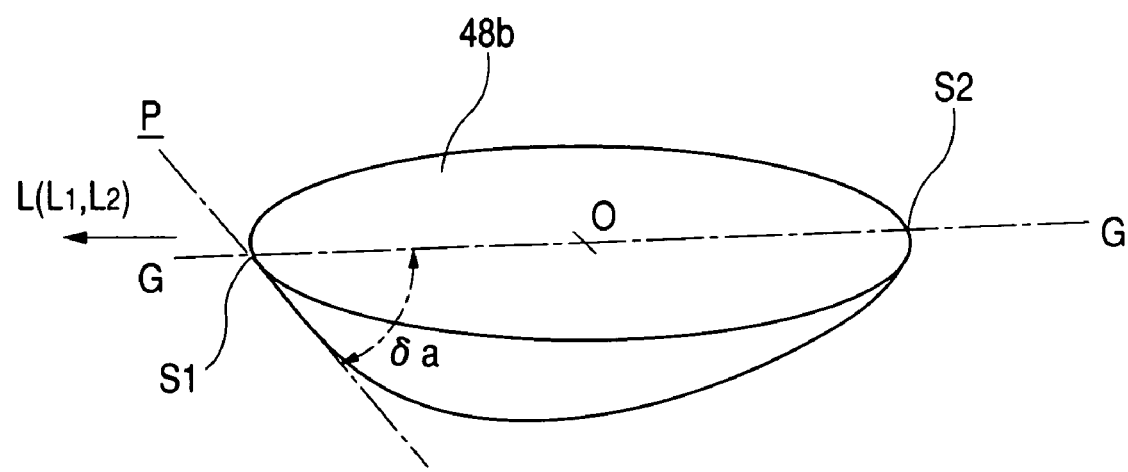
FIG. 9 is a perspective view showing a concave portion of a reflector according to a third embodiment of the present invention.
Figure 10:
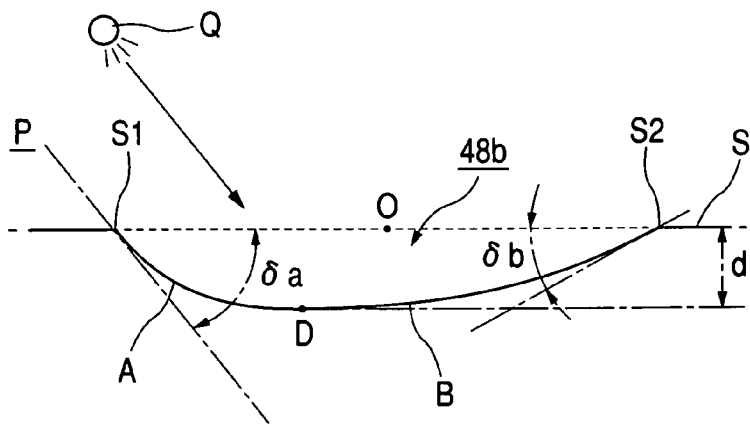
FIG. 10 is a sectional view taken along line G-G of FIG. 9.

FIG. 9 shows a schematic perspective view of the reflector according to the present embodiment, and FIG. 10 shows a schematic sectional view of the corresponding concave portion. Also, the structure of the reflector according to the present embodiment is equal to that of the reflector 30 according to the first embodiment shown in FIGS. 2, 3 and 4, except for the structure of the concave portion shown in FIGS. 9 and 10.

The reflector according to the present embodiment is characterized by reflection brightness that is asymmetrically distributed with respect to the specular angle of the incident light. In order to have such reflection characteristics, the reflector according to the present embodiment is formed so that the inner shape of the concave portion 48b is controlled as described below.

The reflector according to the present embodiment can be applied as a reflector characterized by a reflection brightness distribution that is asymmetrical with respect to the specular direction. In the first section (the section corresponding to line G-G) shown in FIG. 9, the inner shape of the concave portion 48b comprises a first curve A connected from one peripheral portion S1 to a deepest point D and a second curve B connected from the deepest point D to the other peripheral portion S2, continuous with the first curve A. The inclined angle with respect to the surface S of the reflective film is zero at the deepest point D and thus both these curves are connected to each other.

Here, the term "inclined angle' is the angle between the horizontal surface (here, the surface S of the base member on which concave portions 48b are not formed) and the line tangent to any point of the inner surface of the concave portion 48b in the first section.

The inclined angle to the surface S of the first curve A is steeper than the inclined angle of the second curve B, and the deepest point D is positioned in the location shifted from the center O of the concave portion 28b toward the axis directions $L_1$, $L_2$. In other words, the average of the absolute value of the inclined angle to the surface S of the first curve A is larger than the average of the absolute value of the inclined angle to the surface S of the second curve B. The inclined angles to the surface S of the first curve A in a plurality of the concave portions 48b formed on the reflector are irregularly distributed in the range of 1 to 89°. Also, the absolute average values of the inclined angles to the surface S of the second curve B in the concave portion 48b are irregularly distributed in the range of 0.5 to 88°.

Since the inclined angles of both the curves are gently changed, a maximum inclined angle δa (absolute value) of the first curve A is larger than a maximum inclined angle δb (the absolute value) of the second curve B. The inclined angle to the surface of the base member at the deepest point D where the first curve A contacts the second curve B is zero, and the first curve A having the inclined angle of a negative value and the second curve B having the inclined angle of a positive value are gently connected to each other.

The maximum inclined angles δa in a plurality of the concave portions 48b formed on the surface of the reflective film are irregularly distributed in the range of 2 to 90°, but the maximum inclined angles δa in most of the concave portions 48b are irregularly distributed in the range of 4 to 35°.

The concave portion 48b has a minimum point D of which the number of the concave surface is one (the point on the curved surface at which the inclined angle is zero). And the distance between the minimum point and the surface S of the reflective film forms the depth d of the concave portion 28b, and the depths.d are irregularly distributed in the range of 0.1 μm to 3 μm among a plurality of the concave portions 48b.

Figure 11:
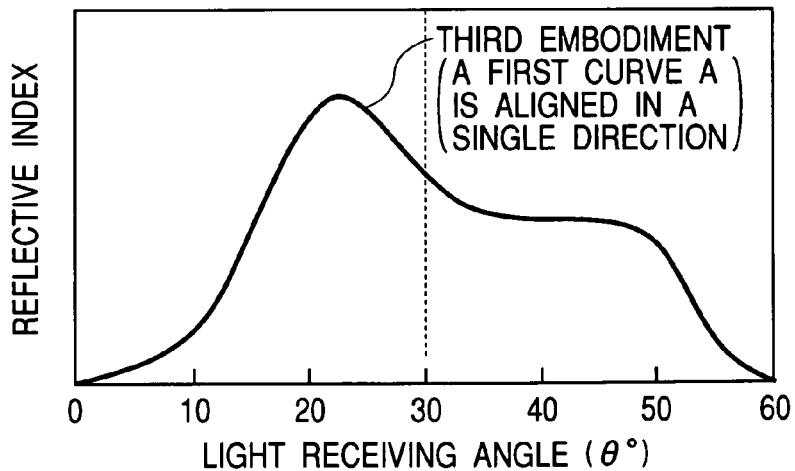
FIG. 11 shows the reflection characteristics of the reflector according to the third embodiment of the present invention and is a graph showing the relationship between the light-receiving angle and reflectivity.

The relationship between the light-receiving angle (unit: °) and the brightness (reflectivity, unit: %) when irradiating the light to the reflective surface of the reflector (the surface of the reflective film) used in the present embodiment at an incidence angle of 30° in the Q direction of FIG. 10 and changing the light-receiving angle over the range from 0° (normal to the reflective surface) to 60° on the basis of 30° that is the specular direction for the reflective surface is shown in FIG. 11. As shown in FIG. 11, the reflectivity at incidence angles smaller than the specular direction of 30° is the highest, and the peak value of reflectivity becomes high.

According to the reflector of the present embodiment, since the concave portion 48b has the above-mentioned shape, the light emitted from the light source for illumination can be efficiently reflected and diffused. In addition, since the reflection light reflected from the reflector has a orientation that the reflectivity become high in one specific direction, the emitting angle of the reflection light through the reflector becomes wide and the emitting efficiency at a predetermined emitting angle can be improved.

Fourth Embodiment

Figure 12:
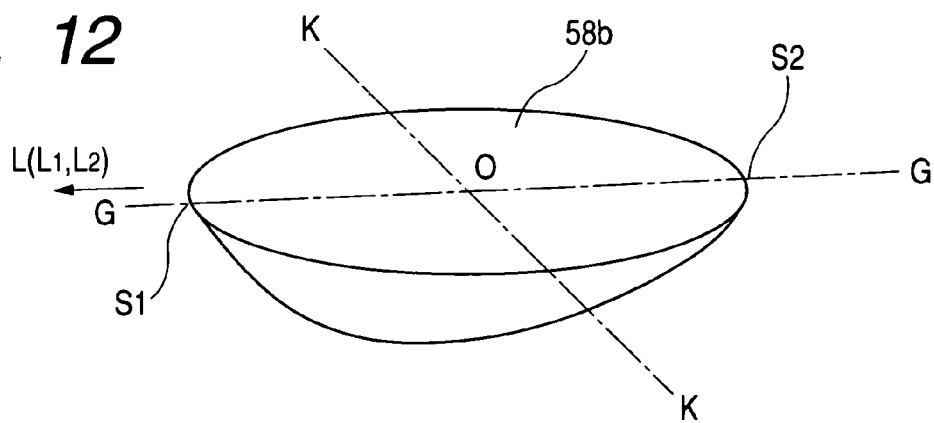
FIG. 12 is a perspective view showing a concave portion of a reflector according to a fourth embodiment of the present invention.
Figure 13:
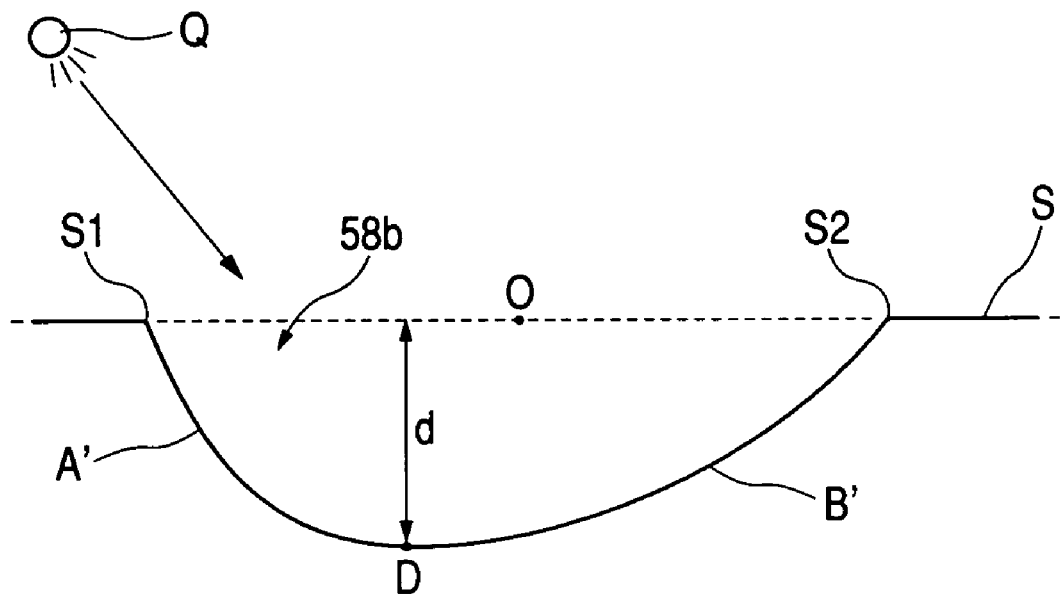
FIG. 13 is a sectional view taken along line G-G of FIG. 12.
Figure 14:
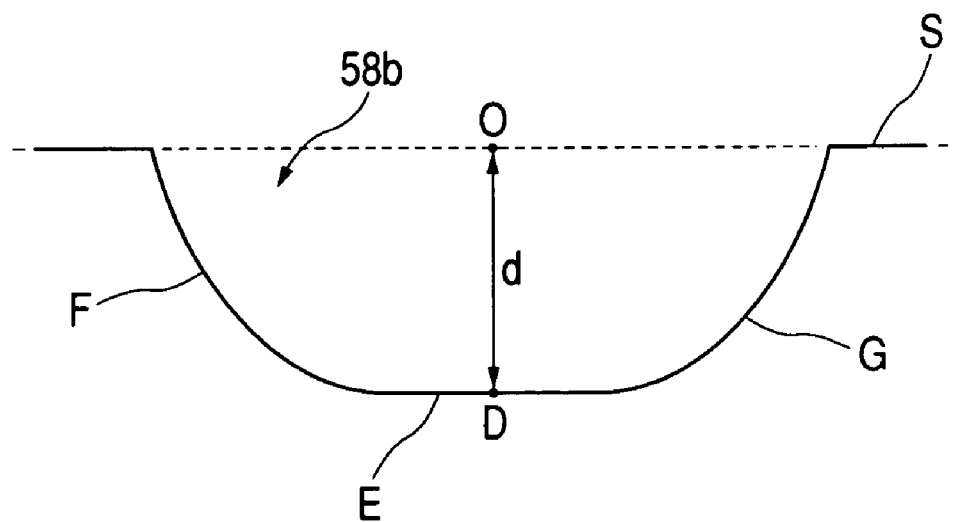
FIG. 14 is a sectional view taken along line K-K shown in FIG. 12.

Next, a reflector according to a fourth embodiment of the present invention will be explained with reference to FIGS. 12 to 14. FIG. 12 is a schematic perspective view of a concave portion 58b of the reflector according to the present embodiment, FIG. 13 is a schematic sectional view along a first section (a section corresponding to line G-G) of the concave portion 58b of the reflector, and FIG. 14 is a sectional view along the section corresponding to a straight line K perpendicular to the first section. The structure of reflector according to the present embodiment is equal to that of the reflector according to the first embodiment shown in FIGS. 2, 3 and 4, except for the structure of the concave portions shown in FIGS. 12 to 14.

As shown in FIGS. 12 and 13, the inner shape of the first section (the section corresponding to line G-G) of the concave portion 58b comprises a first curve A' connected from one peripheral portion S1 to a deepest point D and a second curve B' connected from the deepest point D to the other peripheral portion S2, continuous with the first curve. In FIG. 13, the inclined angle to the surface S of the base member at the deepest point D is zero and thus the first curve A' descending toward the right direction and the second curve B' ascending toward the right direction are smoothly connected to each other with a continuous change in slope.

Here, the term "inclined angle" is the angle between the horizontal surface (here, the surface S of the base member which the concave portion is not formed) and the line tangent to any point of the inner surface of the concave portion in the first section.

The inclined angle to the surface S of the first curve A' is steeper than the inclined angle of the second curve B', and the deepest point D is positioned in a location shifted from the center O of the concave portion 58b toward the axis directions $L_1$, $L_2$. In other words, the average of the absolute value of the inclined angle of the first curve A' is larger than the average of the absolute value of the inclined angle of the second curve B'. The absolute average values of the inclined angles of the first curve A' in the concave portions 58b are irregularly distributed in the range of 2 to 90°. Also, the absolute average values of the inclined angles of the second curve B' in the concave portions 58b are irregularly distributed in the range of 1 to 89°.

On the other hand, as shown in FIG. 14, the inner shape in the section corresponding to the straight line K of the concave portion 58b has a substantially uniform horizontal shape with respect to the center O of the concave portion 58b and in the region near the deepest point D of the concave portion 58b has a shallow curve E having large radius of curvature, that is, close to a straight line. Also, the left and right sides of the shallow curve E have deep curves F, G having small radius of curvature, and the absolute value of the inclined angle of the shallow curve E in a plurality of the concave portions 58b formed on the surface of the reflector is about less than 10°. The absolute values of the inclined angles of the deep curves F, G in a plurality of concave portions 58b are irregularly distributed in the range of, for example, 2 to 90°. Also, the depths d of the deepest points D are irregularly distributed in the range of 0.1 to 3 μm.

Figure 15:
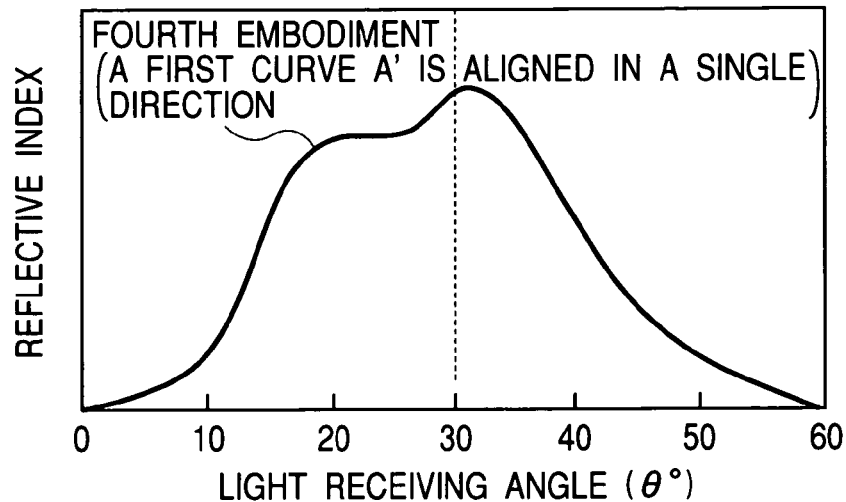
FIG. 15 shows the reflection characteristics of the reflector according to the fourth embodiment of the present invention and is a graph showing the relationship between the light-receiving angle and reflectivity.
Figure 16:
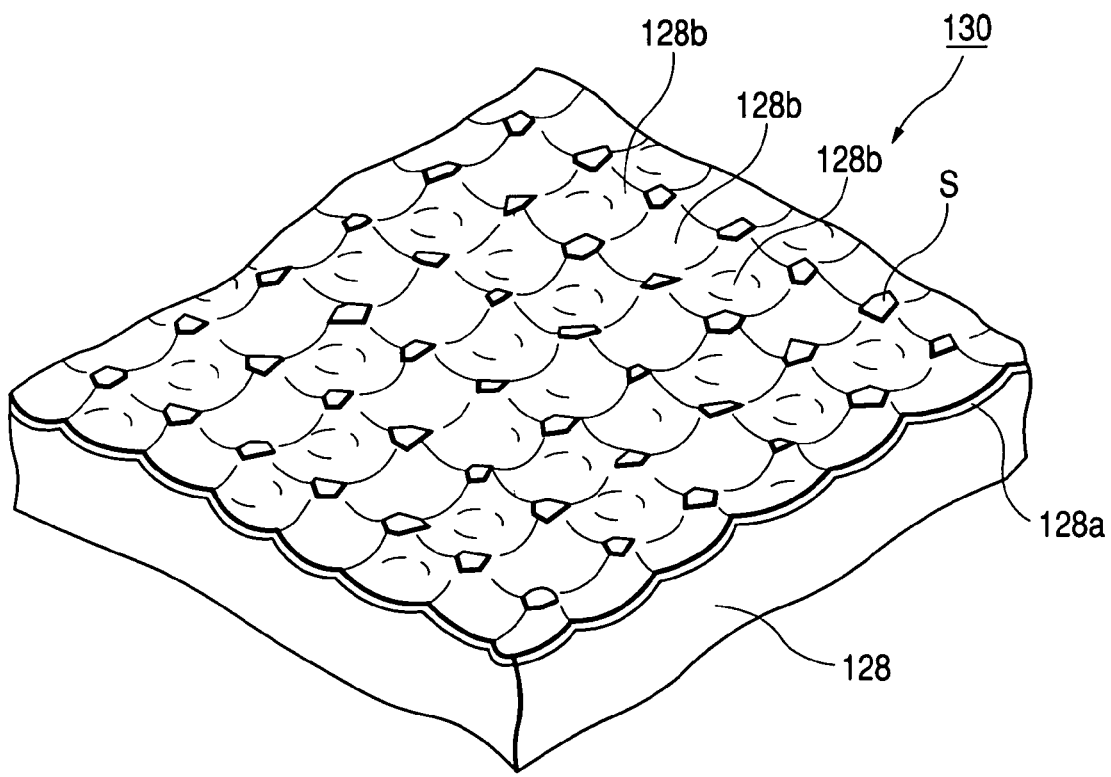
FIG. 16 is a perspective view showing a conventional reflector.
Figure 17A:
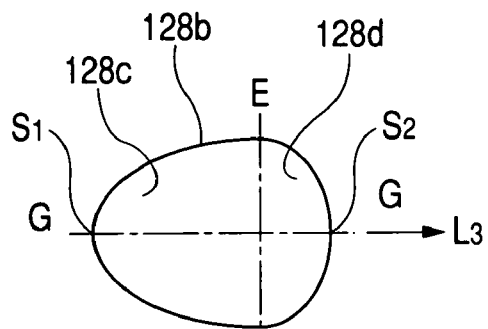
FIG. 17A is a plan view thereof and FIG. 17B is a sectional view thereof.
Figure 17B:
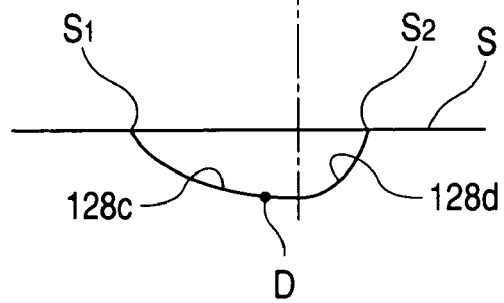
Figure 18:
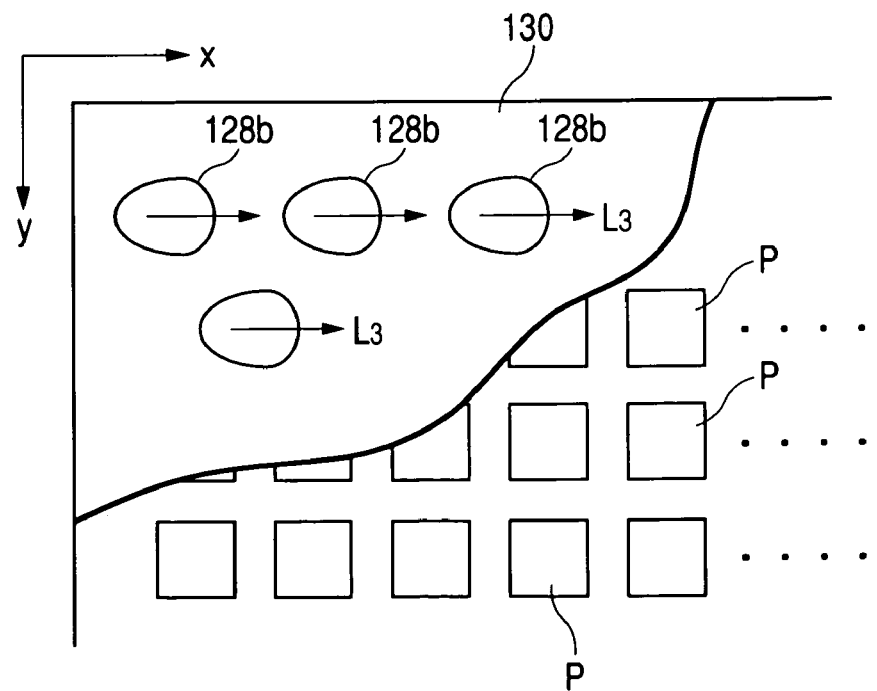
FIG. 18 is a plan view showing the structure of a portion of the conventional liquid crystal display device.

FIG. 15 shows the relationship between the light-receiving angle ($\theta°$) and the reflectivity when irradiating the light to the reflector of the present embodiment at an incidence angle of 30° in the direction closer to the axis direction L than the normal direction of the surface S and continuously changing the viewing angle in the range from 0° (normal to the reflective surface) to 60° on the basis of a specular direction of 30° to the surface S. In the reflection characteristics of the graph, the integrated value of the reflectivity over a range of reflection angles smaller than the specular angle of 30° is larger than the integral value of the reflectivity over the range of reflection angles larger than the specular angle, and the reflection direction is shifted to the normal line direction, rather than the specular direction.

Accordingly, according to the reflector of the present invention, since the concave portion 58b has the above-mentioned shape, the incident light can be efficiently reflected and diffused. In addition, since the reflection light reflected from the reflector has an orientation that the reflectivity become high in a predetermined direction, the emitting angle of the reflection light through the reflector becomes wide and the emitting efficiency in a predetermined emitting angle can be improved.

In addition, in the liquid crystal display device of the present embodiment, although the example in which the reflector is positioned on the outside of the liquid crystal display panel has been described, the present invention is not limited thereto, and the reflector may be positioned between two substrates of the liquid crystal display panel. In this case, in FIG. 1, it is desirable that the reflector is laminated onto the second substrate 22 and the display circuit 27 including the driving electrode 27a is laminated onto the reflector.

As mentioned above, according to the reflector of the present invention, since the axis direction of the concave portion is not parallel with the arrangement direction, the moiré effect due to the reflector can be prevented. Also, since the axis directions of the concave portions are set to two or more directions, the change of the reflectivity due to variation of the viewing direction of the viewer can be reduced.

Also, according to the liquid crystal display device of the present invention, since the arrangement direction of the pixels is equal to the arrangement direction of the concave portions in the reflector, the axis direction of the concave portions is not parallel with the arrangement direction of the concave portions. Thereby, the interference of the light between the pixels and the concave portions of the reflector can be reduced and thus the generation of moiré patterns can be remarkably reduced.

What is claimed is:

1. A reflector formed with a plurality of concave portions on one surface of a base member, each concave portion comprises of a curved surface;
    wherein, when defining a section passing through a deepest point of the concave portion as a first section and defining a section perpendicular to the first section at the deepest point as a second section, the concave portions have symmetrical shapes on the basis of the first section and have asymmetrical shapes on the basis of the second section, and
    wherein, when defining directions along the first section in each of the concave portions as axis directions, the axis directions are set to two or more directions,
    wherein, when defining the direction that each of the concave portions face as arrangement directions, the arrangement direction of each of the concave portions is in substantially the same direction,
    wherein, when defining an angle between the axis direction of the concave portions and an arrangement direction of pixels as an axis angle, the concave portions comprise a plurality of first concave portions having the axis angle of $\theta_1°$ and a plurality of second concave portions having the axis angle of $\theta_2°$,
    wherein the axis angle of $\theta_1°$ is not set to 0°, and
    wherein an absolute value of an average axis angle $\theta_m$ between an average direction of the axis directions of all the concave portions and the arrangement direction of the pixels is set in the range of $0°<\theta_m\leq20°$.

2. The reflector according to claim 1, wherein, when defining an angle between an average direction of the axis directions of all the concave portions and an arrangement direction of pixels as an average axis angle $\theta_m$, the absolute value of the average axis angle $\theta_m$ is set in the range of $0°\leq\theta_m\leq20°$.

3. The reflector according to claim 1, wherein, when defining an angle between the axis direction of the concave portions and an arrangement direction of pixels as an axis angle, the concave portions comprise a plurality of first concave portions having an axis angle of $\theta_1°$ and a plurality of second concave portions having the axis angle of $\theta_2°$ and the average axis angle $\theta_m$ is set to 0°.

4. The reflector according to claim 1, wherein, when defining an angle between the axis direction of the concave portions and an arrangement direction of pixels as an axis angle, the concave portions comprise a plurality of first concave portions having the axis angle of $\theta_1°$ and a plurality of second concave portions having the axis angle of $\theta_2°$, an average axis angle $\theta_m$ is set to 0°, the relationship between the axis angle $\theta_1°$ and the axis angle $\theta_2°$ is $\theta_2°=-\theta_1°$, and the axis angle $\theta_1°$ is set in the range of $0°<\theta_1\leq20°$.

5. The reflector according to claim 1, wherein, when defining an angle between the axis direction of the concave portions and an arrangement direction of pixels as an axis angle, the concave portions comprise a plurality of first concave portions having the axis angle of $\theta_1°$ and a plurality of second concave portions having the axis angle of $\theta_1°>\theta_2°$.

6. The reflector according to claim 2, wherein, when defining the angle between the axis direction of the concave portions and the arrangement direction of the pixels as an axis angle, the concave portions comprise a plurality of first concave portions having the axis angle of $\theta_1°$ and a plurality of second concave portions having the axis angle of $\theta_1°>\theta_2°$, the axis angle $\theta_1°$ is set in the range of $-20°<\theta_1°40°$, the axis angle $\theta_2°$ is set in the range of $-40°\leq\theta_2<20°$.

7. A liquid crystal display device, comprising a pair of substrates, a liquid crystal layer positioned between the substrates, driving electrodes formed on the liquid crystal layer side of the substrates, and a reflector according to claim 1 mounted on any one of the substrates,
    wherein an arrangement direction of pixels comprised of the driving electrodes and the liquid crystal layer is equal to one arrangement direction in the reflector.

8. A reflector formed with a plurality of concave portions on one surface of a base member along one arrangement direction,
    wherein, when defining a section passing through a deepest point of the concave portion as a first section and defining a section perpendicular to the first section at the deepest point as a second section, the concave portions have symmetrical shapes on the basis of the first section and have asymmetrical shapes on the basis of the second section, wherein, when defining the directions along the first section in each of the concave portions as axis directions, the axis directions are substantially equal to but are not parallel with the arrangement direction, and the axis directions are set to two or more directions, wherein, when defining an angle between the axis direction of the concave portions and an arrangement direction of pixels as an axis angle, the axis angle is not set to 0°, and wherein an absolute value of an average axis angle $\theta_m$ between an average direction of the axis directions of all the concave portions and the arrangement direction of the pixels is set in the range of $0°<\theta_m \leq 20°$.

9. A liquid crystal display device, comprising a pair of substrates, a liquid crystal layer positioned between the substrates, driving electrodes formed on the liquid crystal layer side of the substrates, and a reflector according to claim 8 mounted on any one of the substrates, wherein an arrangement direction of pixels comprised of the driving electrodes and the liquid crystal layer is equal to one arrangement direction in the reflector.

10. The reflector according to claim 8, wherein, when defining an angle between an average direction of the axis directions of all the concave portions and an arrangement direction of pixels as an average axis angle $\theta_m$, the absolute value of the average axis angle $\theta_m$ is set in the range of $0° \leq \theta_m \leq 20°$.

11. The reflector according to claim 8, wherein, when defining an angle between the axis direction of the concave portions and an arrangement direction of pixels as an axis angle, the concave portions comprise a plurality of first concave portions having the axis angle of $\theta_1°$ and a plurality of second concave portions having an axis angle of $\theta_2°$ and the average axis angle $\theta_m$ is set to 0°.

12. The reflector according to claim 8, wherein, when defining an angle between the axis direction of the concave portions and an arrangement direction of pixels as an axis angle, the concave portions comprise a plurality of first concave portions having the axis angle of $\theta_1°$ and a plurality of second concave portions having the axis angle of $\theta_2°$, an average axis angle $\theta_m$ is set to 0°, the relationship between the axis angle $\theta_1°$ and the axis angle $\theta_2°$ is $\theta_2°=-\theta_1°$, and the axis angle $\theta_1°$ is set in the range of $0°<\theta_1 \leq 20°$.

13. The reflector according to claim 8, wherein, when defining an angle between the axis direction of the concave portions and an arrangement direction of pixels as an axis angle, the concave portions comprise a plurality of first concave portions having the axis angle of $\theta_1°$ and a plurality of second concave portions having the axis angle of $\theta_1°>\theta_2°$.

14. The reflector according to claim 10, wherein, when defining the angle between the axis direction of the concave portions and the arrangement direction of the pixels as an axis angle, the concave portions comprise a plurality of first concave portions having the axis angle of $\theta_1°$ and a plurality of second concave portions having the axis angle of $\theta_1°>\theta_2°$, the axis angle $\theta_1°$ is set in the range of $-20°<\theta_1 \leq 40°$, the axis angle $\theta_2°$ is set in the range of $-40° \leq \theta_2 20°$.

* * * * *

UNITED STATES PATENT AND TRADEMARK OFFICE
CERTIFICATE OF CORRECTION

| | |
|---|---|
| PATENT NO. | : 7,388,634 B2 |
| APPLICATION NO. | : 10/832518 |
| DATED | : June 17, 2008 |
| INVENTOR(S) | : Katsumasa Yoshii et al. |

It is certified that error appears in the above-identified patent and that said Letters Patent is hereby corrected as shown below:

In column 14, claim 6, line 53, after "the range of -20°<" delete "$\theta_1°40°$" and substitute --$\theta_1 \leq 40°$-- in its place.

In column 16, claim 14, line 30, after "in the range of -40°$\leq \theta_2$" insert --<--.

Signed and Sealed this

Twenty-fourth Day of March, 2009

JOHN DOLL
*Acting Director of the United States Patent and Trademark Office*